United States Patent
Deninno

(10) Patent No.: US 9,868,455 B1
(45) Date of Patent: Jan. 16, 2018

(54) TENT BALLAST CONCRETE BLOCK HANDLING SYSTEM

(71) Applicant: Nicholas Deninno, Carle Place, NY (US)

(72) Inventor: Nicholas Deninno, Carle Place, NY (US)

(*) Notice: Subject to any disclaimer, the term of this patent is extended or adjusted under 35 U.S.C. 154(b) by 0 days.

(21) Appl. No.: 15/169,674

(22) Filed: May 31, 2016

Related U.S. Application Data

(60) Provisional application No. 62/167,691, filed on May 28, 2015.

(51) Int. Cl.
  *E04H 15/62* (2006.01)
  *B62B 3/04* (2006.01)
  *B62B 3/00* (2006.01)

(52) U.S. Cl.
  CPC .............. *B62B 3/04* (2013.01); *B62B 3/008* (2013.01); *E04H 15/62* (2013.01)

(58) Field of Classification Search
  CPC ............ E04H 15/62; E04H 15/58; B62B 3/04
  USPC ............................................. 135/118, 120.1
  See application file for complete search history.

(56) References Cited

U.S. PATENT DOCUMENTS 8,573,609 B1 * 11/2013 Moser ..................... B62B 1/14
  135/118

OTHER PUBLICATIONS

Block and Roll Aluminum Mover Cart Demo https://www.youtube.com/watch?v=PalfHGUZJY0 Mar. 15, 2013.*
Event Central Rental and Sales, Hershey AACA Fall National Meet 2012—Tent Rentals Abound, Jul. 26, 2012, Mechancanicsburg, PA.
Event Central Rental and Sales, Facebook post, Aug. 11, 2015.
Got You Cover'd Inc, Facebook post, Jan. 18, 2016.
Big Ten Rentals, Facebook post, tent ballast with forklift, Mar. 5, 2015, Iowa.
Event Central Rental and Sales, Facebook Post, concrete tent ballasts, Sep. 9, 2015, Mecanicsburg, PA.
Arena Americas, Bob Uecker Statue Dedication Facebook post, Sep. 12, 2012 Miller Park Stadium, Milwaukee, WI.
Starr Tents, Facebook post, tent with small blocks, Nov. 9, 2012, Breezy Point, NY.
Blue Peak Tents, After the blizzard, Tenting like moves on.(round tent blocks), Feb. 9, 2015, Chicago, IL.
Closing of the Tevatron, (large round blocks), Sep. 9, 2015, Chicago, IL.

* cited by examiner

*Primary Examiner* — Kaitlin Joerger
(74) *Attorney, Agent, or Firm* — Collard & Roe, P.C.

(57) ABSTRACT

A system for ballasting tents, includes a ballast (3) cast of concrete. Each ballast has a top surface (33t). A front surface (4) has a rectangular pocket (5), sized to receive a lifting fork (19). The pocket (5) extends through the front surface (4) and through the back surface (93). The front surface has a front recess (9) below the pocket (5). A front tie-down (32D), is cast into the ballast. The front tie-down has a bend extending out from the concrete into the front recess (9), but not out beyond the front surface (4). There is a top recess (7) in the top surface (33t). A top tie-down point (6) is cast into the ballast, extending into the top recess (7), but not extending above the top surface (33t).

10 Claims, 20 Drawing Sheets

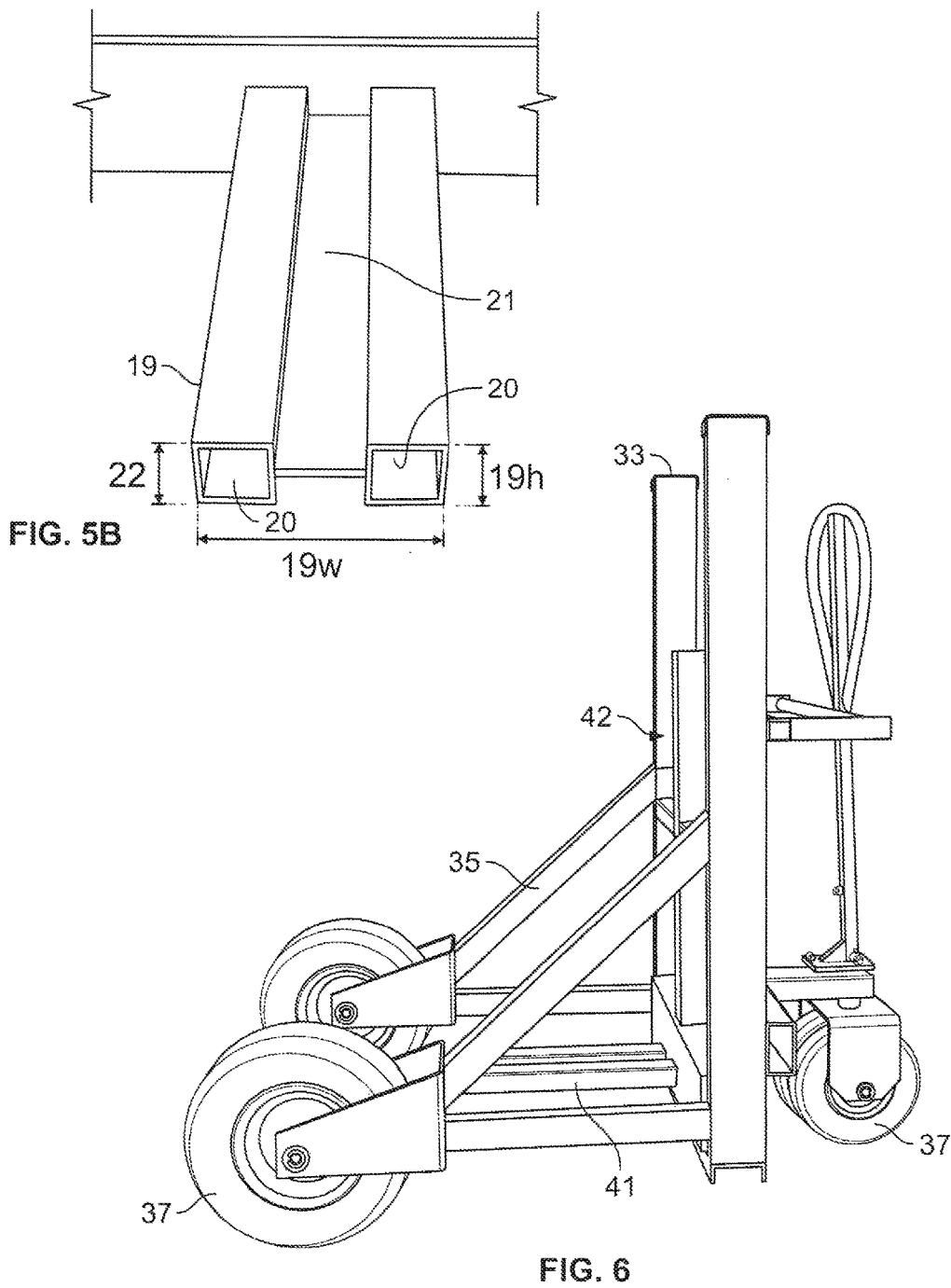

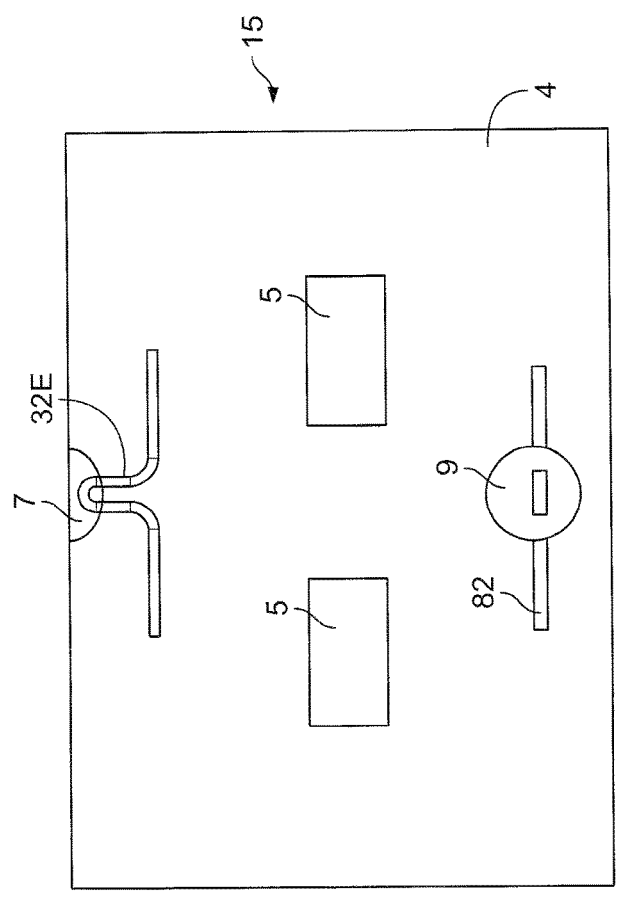
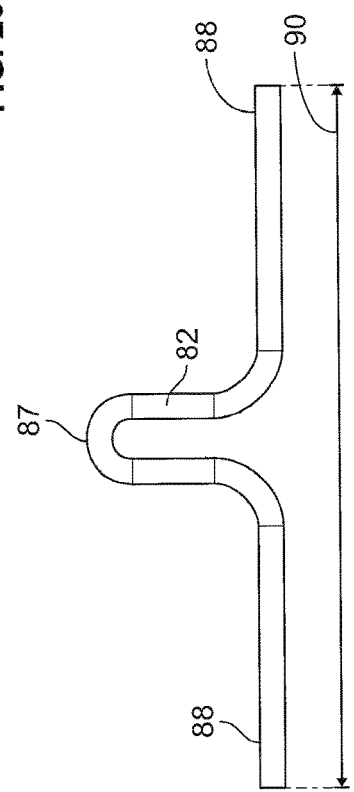
FIG. 26
FIG. 27

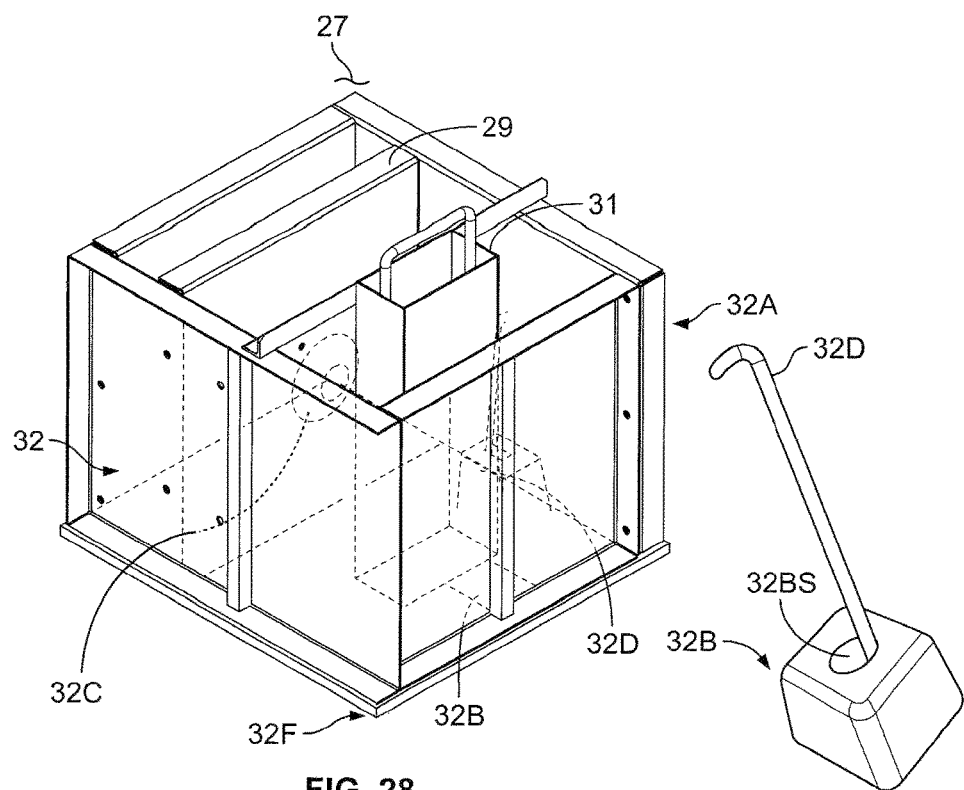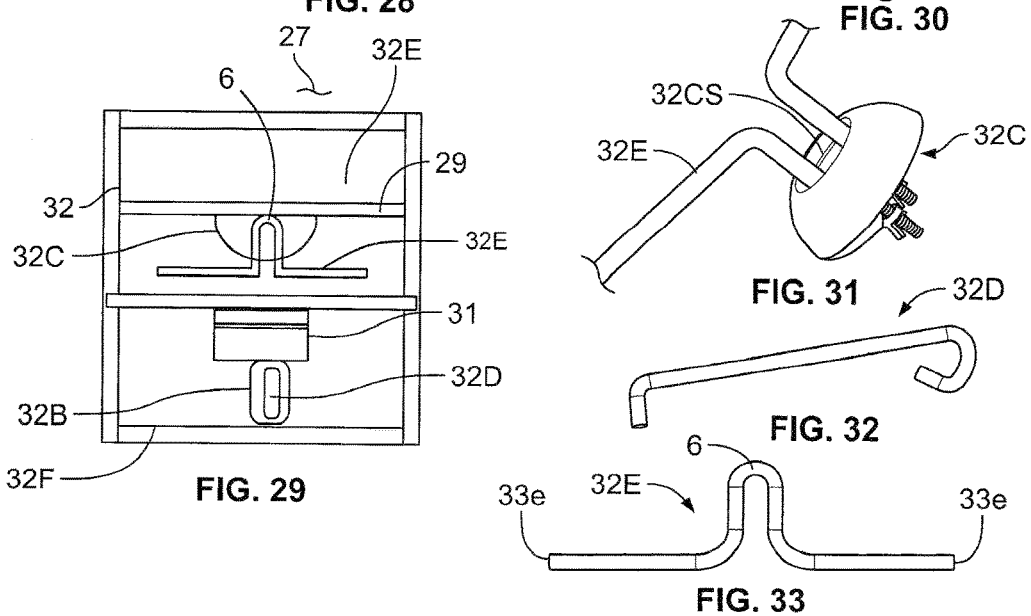

TENT BALLAST CONCRETE BLOCK HANDLING SYSTEM

This is a non-Provisional Utility Patent Application, claiming benefit and priority of a Provisional Patent Application No. 62/167,691, filed 28 May 2015, by inventor Nicholas Deninno, entitled: Tent Ballast Concrete Block Handling System.

BACKGROUND

As paved surfaces and underground utilities have made tent stakes more difficult to use, tent erectors have been using ballast, to hold tent ropes, instead of stakes. Plastic or steel drums have been filled with water, and tied to tents. Conventional concrete blocks have been tied to tents.

BRIEF DESCRIPTION

The present invention is a method and apparatus for ballasting tent systems. The invention is particularly useful when the surface, on which the tent will be erected, is paved, or may have underground installations that may be catastrophically damaged by tent stakes.

The present invention uses novel concrete ballasts, which come in a variety of: shapes, sizes, and weights.

Each ballast comprises:
two tie-downs; and
at least one pocket for receiving a lifting fork.

The present invention uses a novel lifting fork, and novel carts to move the ballasts.

BRIEF DESCRIPTION OF THE DRAWINGS

FIG. 5B is a front perspective view of a novel lifting fork of the present invention.

FIG. 6 is a side upper perspective view of a hydraulic lifting cart.

FIG. 13 A is a view four different parts, used with the casting form.

FIG. 26 is a front elevation of a 3500-pound block showing a normally-hidden top tie off point, and a front tie-off point, visible in the front recess, which would be mostly hidden in this view.

FIG. 27 is bottom plan view of the front tie-off point.

FIG. 28 is a perspective view of a steel concrete-block-casting form.

FIG. 29 is a top-plan view of view of the steel concrete-block-casting form.

FIG. 30 is a perspective view of a front tie off hook, set in a recess knock-out for insertion into the casting form.

FIG. 31 is a perspective view of a top tie-off hook, set in a recess knock-out for bolting into the casting form.

FIG. 32 is a side elevation of a front tie-off hook.

FIG. 33 is a front elevation of a top tie-off hook.

DETAILED DESCRIPTION

Specially Designed Tent Ballast Cement Blocks

Figure 1:
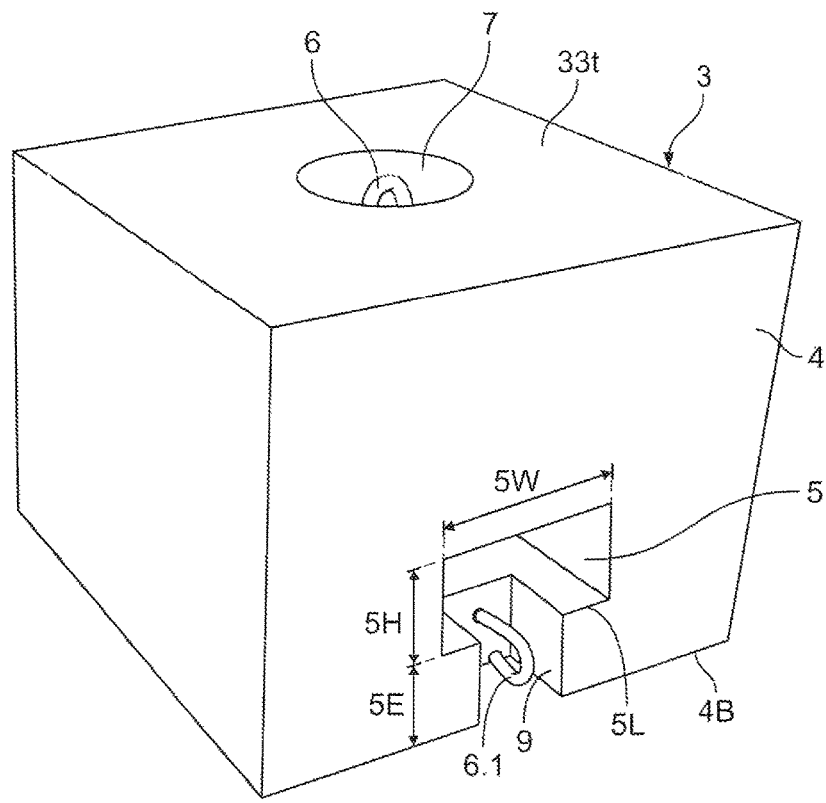
FIG. 1 is a perspective view of a novel 500-pound ballast block.

FIG. 1 shows a 500 lb. ballast block 3.

The block 3 has a front surface 4, having a front bottom 4B.

A fork pocket 5 having a extends horizontally inward from a vertical outside front surface 4 of the block, for receiving a fork. The fork pocket 5 has a floor 5L that is at an elevation 5E that is 4" above the bottom 4B of the block 3. Pocket 5 has a floor 5L, and a roof 5R that are parallel planes to each other. Pocket 5 has a pair of sidewalls 5RS & 5LS that are parallel planes to each other. The sidewalls 5RS & 5LS are orthogonal to the roof 5R and floor 5L. The fork pocket 5 is 4" high 5h by 8" wide 5w. Fork pocket 5 has a lower edge or floor 5L that is at an elevation 5e, that is 4" above the bottom of the block, at front bottom 4B.

Tie-downs 6 & 6.1 are located within tie-down recesses 7 & 9.

Figure 2:
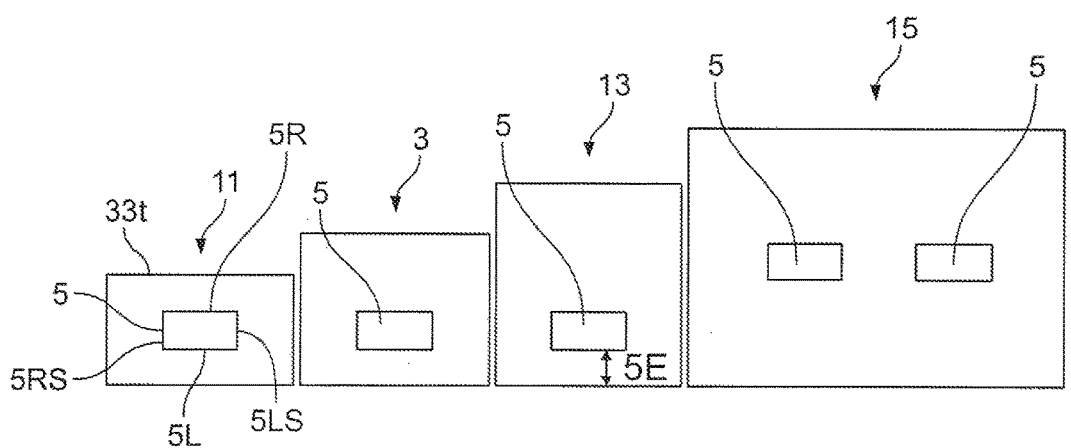
FIG. 2 is a rear elevation of four novel concrete ballast blocks, of 350, 500, 700, and 3500 pounds, shown alongside each other.

FIG. 2 is a rear elevation of specially designed tent ballast cement blocks 11, 3, 13, & 15. See also FIGS. 22-26.

Block 11 is a 350 lb. 20" wide×20" long×12" high block. As in FIG. 1, it has a fork pocket 5 4" high 5h×8" wide 5w, centered at the center of the height and width of the front surface, with the fork pocket center at 10" width and 6" height. All the blocks described below 11, 3, 13, and 15 have a lower edge 5L that is at an elevation 5E, that is 4" above the bottom of the block.

Block 3 is a 500 lb. 20" wide×20" long×16.5" high block. It has a 4"×8" fork pocket 5 centered at the width of the front surface. The fork pocket 5 has a height 5h of 4" and a width 5w of 4", the fork pocket center is at 10" on the block width and 6" above the bottom of the block.

Block 13 is 700 lb. a 20" wide×20" long×22" high block. It has a 4"×8" fork pocket 5 centered at the height and width of the front surface, with the fork pocket center at 10" width and 6" height.

Block 15 is a 3500 lb. 40" wide×40" long×28" high block. It has two 4" high by 8" wide fork pockets 5. The left pocket 5 is edged at 8" from the left edge of the front surface, with the second left fork pocket edge 8" from the right edge of the 1$^{st}$ pocket; and 8" from the right edge of the block 15.

The blocks 11, 3, 13, 15 (FIG. 2) feature an internal 4" high by 8" wide fork pocket 5 (FIG. 2) which is cast into the blocks 11, 3, 13, 15 (FIG. 2).

Blocks 11, 3, 13, 15 (FIG. 2) also feature two recessed tie-off points 7 & 9 (FIG. 1):
  an upper tie-off point 6 in upper tie-off recess 7 at the top (FIG. 1); and
  a lower tie-off point 6.1 in lower tie-off recess 9 (FIG. 1), on the front of the block, which lower tie-off point 6.1 allows for a connection to a tent side pole (not shown).

Fork pockets 5 are positioned so they can be used with our specially designed hand truck 17 (FIG. 3), or with a standard forklift (not shown).

Four sizes of blocks 11, 3, 13, 15 (FIG. 2) include:
  350-pound block 11 (FIG. 2);
  500-pound block 3 (FIG. 2);
  700-pound block 13 (FIG. 2)); and
  3500-pound block 15 (FIG. 2).

Figure 3:
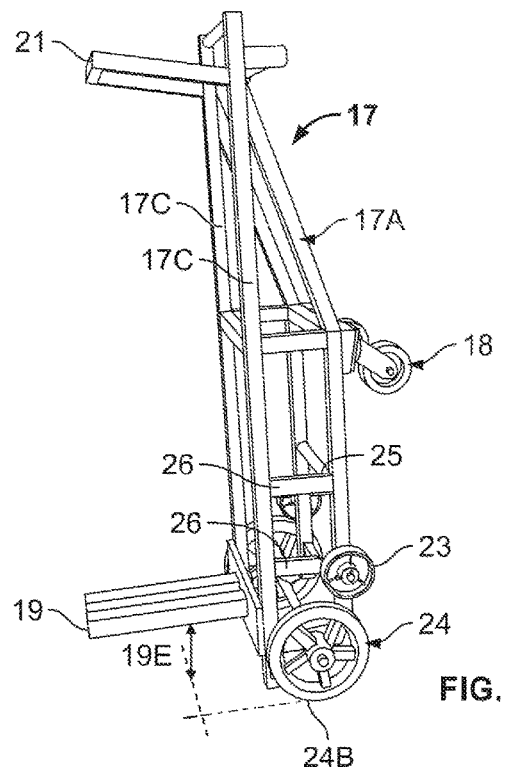
FIG. 3 is a perspective view of a novel hand cart for carrying concrete ballast blocks.

Blocks 3, 11, & 13 are able to be moved with the specially designed hand-truck 17 (FIG. 3).

Blocks, larger than 700 pounds, such as 3500-pound block 15 (FIG. 2), feature two fork pockets 5 (FIG. 2), and can be moved only by forklift (not shown).

Cement Block Hand Truck (FIG. 3)

The cement block hand-truck 17 (FIG. 3) features a frame 17A, and an exclusive fork 19 (FIG. 3).

The frame has uprightable carrying rails 17C.

The fork 19 extends horizontally from the carrying rails 17C, when the rails are upright as in FIG. 3.

Fork 19 is affixed, to frame 17A, preferably by welds to the carrying rail 19C. This orientation places the lowermost fixed attachment point of the fork 19, at a fork elevation 19E of at least 1" more than pocket elevation 5E, which pocket elevation we prefer to be 4". The presently preferred fork elevation 19E is 5⁹⁄₁₆", above the ground under the bottom of the upright cart 17. The bottom 24B of wheels 24 rest on this ground, 5⁹⁄₁₆ inches lower than the fork.

Fork 19 inserts into the fork pockets 5 in specially designed blocks 11, 3, & 13 (FIG. 2). This handcart 17 allows one person to handle up to a 700-pound cement block 13 (FIG. 2), without: assistance, motors, or complicated hydraulics.

As in FIG. 5B, the fork 19 has an outside height 19h of 2" and an outside width 19w of 6". The 2" of minimum extra clearance of:
  the 4" high pocket 5 over the 2" high 19H fork, and
  the 8" wide pocket 5 over the 6" wide 19W fork;
is critical to prevent the block from jamming the fork in the pocket 5 when a block is jostled by motion over rough terrain. The minimum 2" extra clearance is preferred over more clearance, to prevent excessive horizontal shifting, or tilting of the block upon the fork 19.

The front view of the fork 19 comprises a pair of rectangles 20, preferably formed by square-section hollow tubes 20, joined by a center plate 21. The square tube walls are 0.188 inch-thick steel. Each tube 20 has an inside dimension of 1.624 inches. The tubes 20 are joined together by a two-inch wide center plate 21, welded between the tubes 20.

Figure 4:
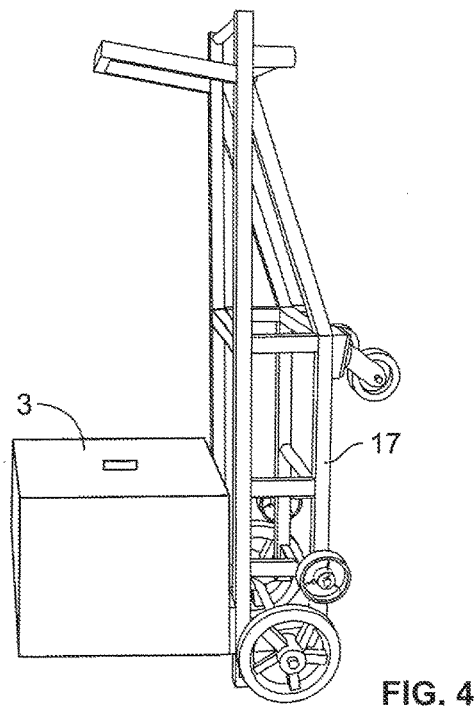
FIG. 4 a perspective view of the hand cart, carrying a 500 lb. block.

The hand-truck 17 (FIG. 3) features six wheels. Two large wheels 24 (FIG. 3) are used for using the hand-truck 17 as a two-wheel hand-truck as in FIG. 4. Two smaller wheels 23 (FIG. 3) are used to pull a block up a curb. Two swivel wheels 18 (FIG. 3) are used to make hand-truck 17 a four-wheel push dolly, as in FIG. 5.

Figure 5:
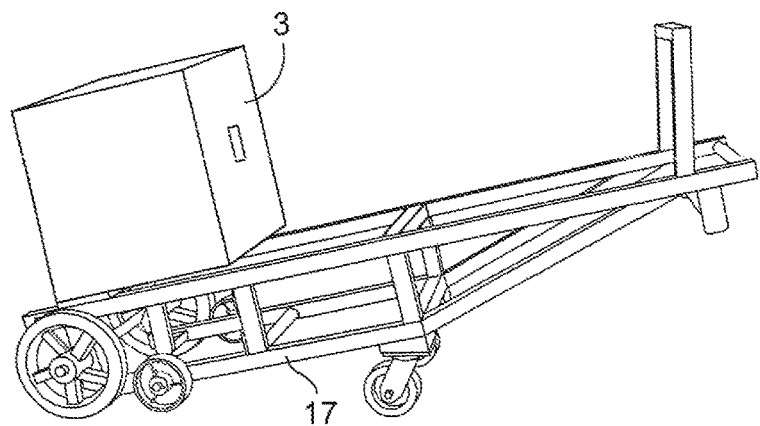
FIG. 5 is a perspective view of the handcart in a horizontal position, carrying the 500-lb. block.
Figure 5A:
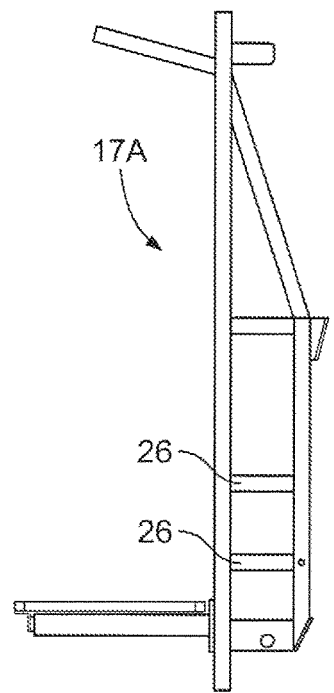
FIG. 5A Is a side elevation of the handcart without wheels, for clarity.

The hand-truck 17 (FIG. 3) is designed with special braces and supports 26 (FIG. 3, FIG. 5A) to withstand real loads of 700 pounds while being used as a two wheel and 1000 pounds while in four-wheel dolly position (FIG. 5).

Figure 22:
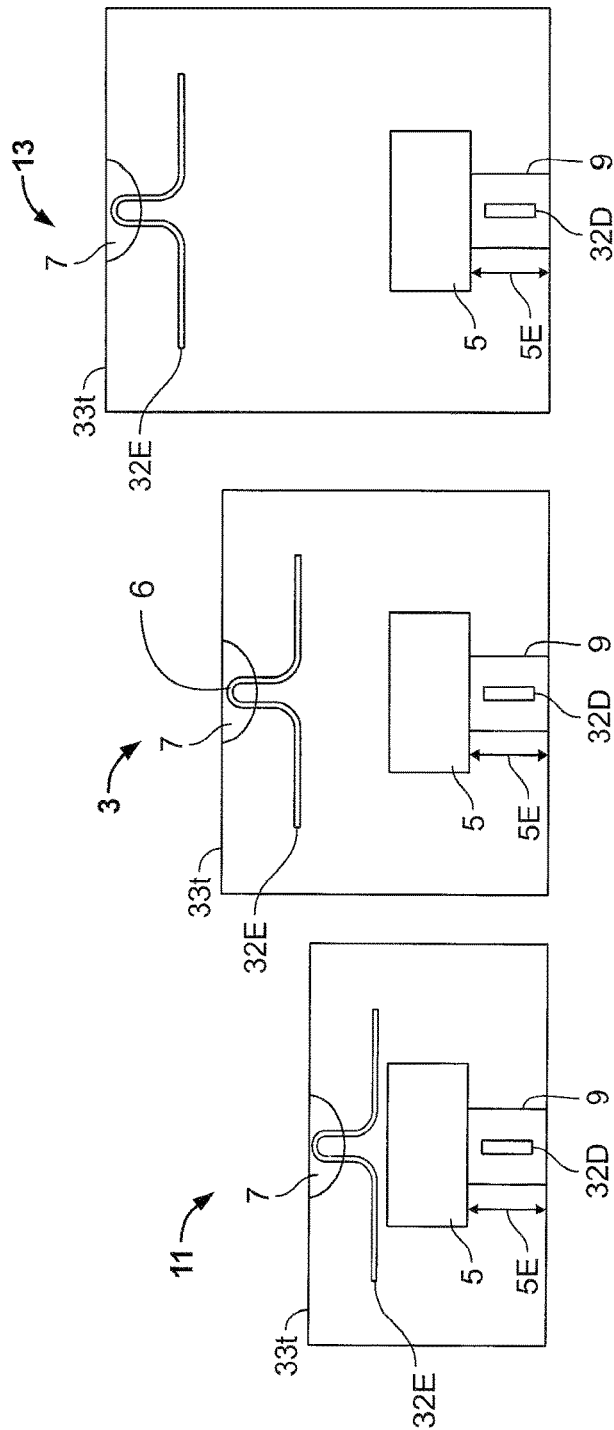
FIG. 22 is a front elevation of a 350-pound block alongside a 500-pound block alongside a 700-pound block, showing a top tie off point, which would be hidden in this view.
Figure 24:
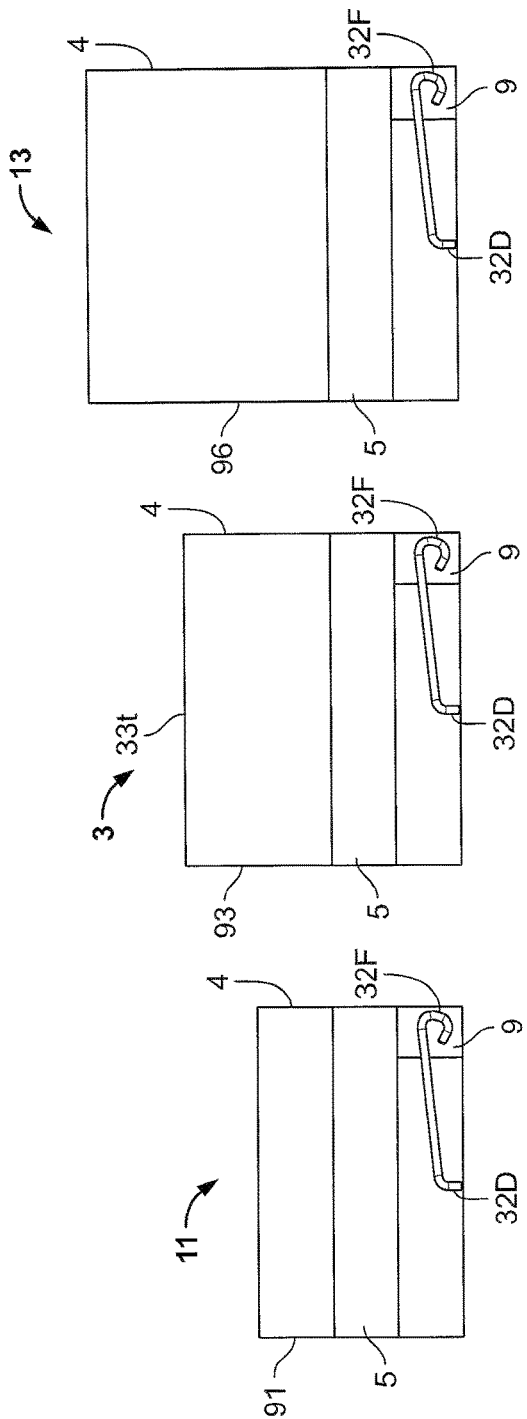
FIG. 24 is a side elevation, sectioned through its center line, of a 350-pound block, behind a 500-pound block, behind a 700-pound block, each showing a front tie-off point.

The hand-truck 17 (FIG. 3) is designed to move 350 pound to 700 pound specially designed cement blocks, 11, 3, 13 (FIGS. 2, 22, & 24). The hand-truck 17 features balanced load carrying, while moving these blocks with minimal effort by the operator.

All Terrain Hydraulic Block Stacking Cart 33 (FIG. 6)

Figure 7:
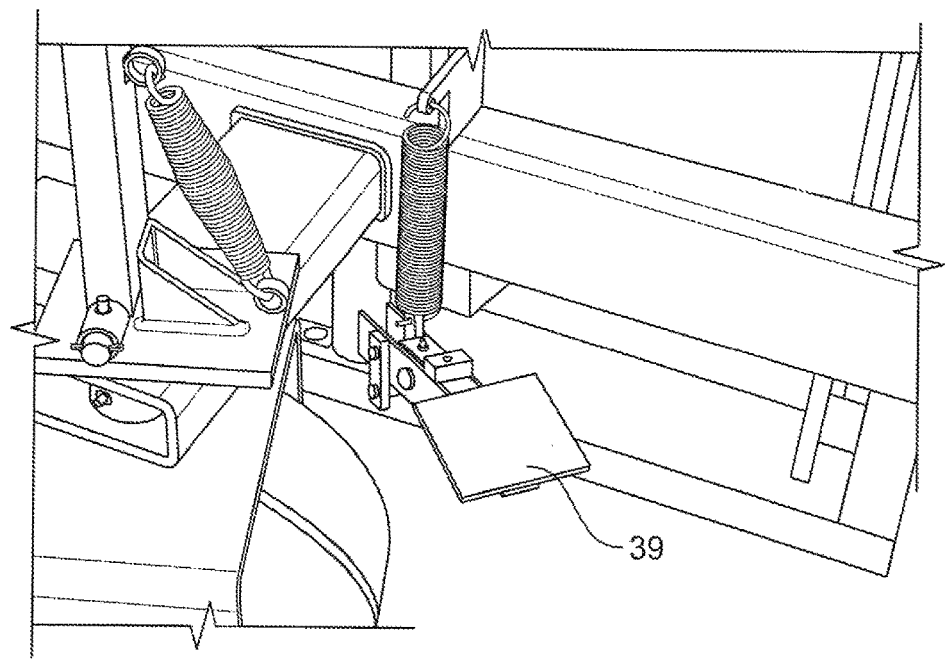
FIG. 7 is a right rear upper perspective view of a foot pump pedal of the hydraulic lifting cart.
Figure 8:
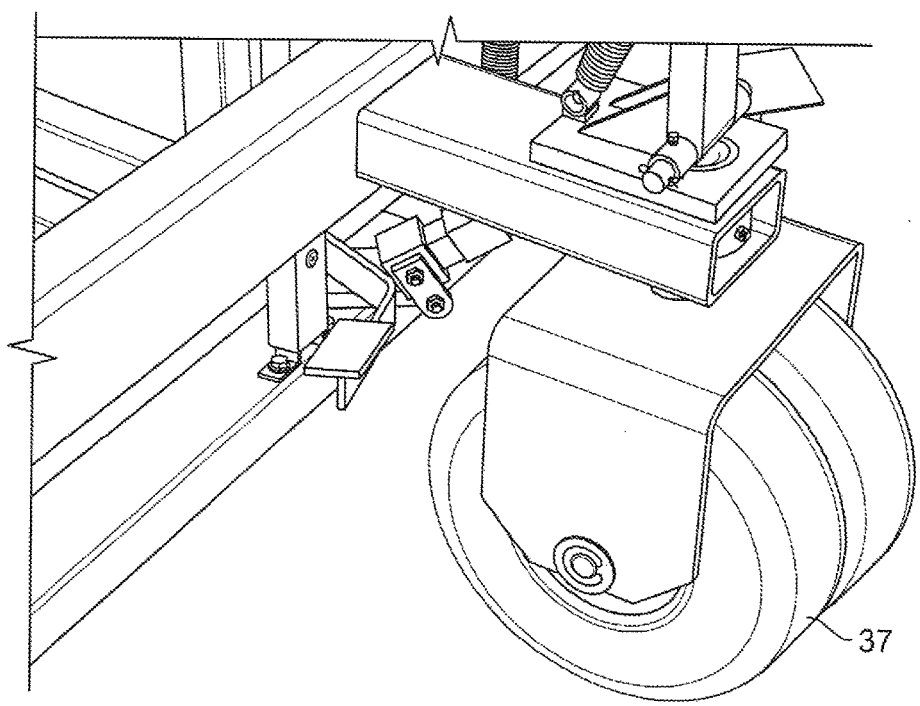
FIG. 8 is an upper rear left perspective view of a release pedal of the hydraulic lifting cart.
Figure 8B:
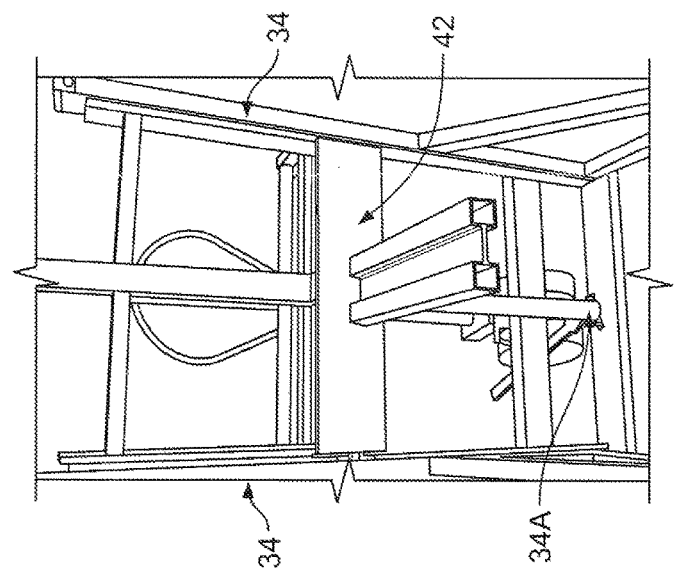
FIG. 8B is an upper front perspective view of the hydraulic lifting cart.
Figure 8A:
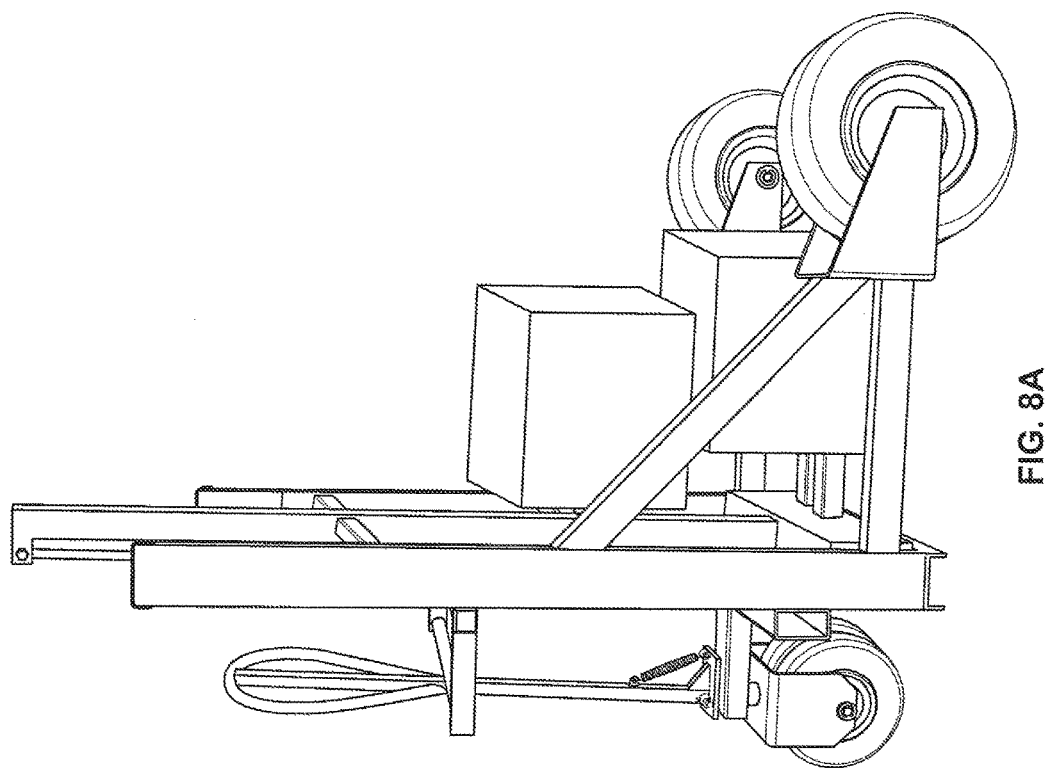
FIG. 8A is an upper right perspective view of the hydraulic lifting cart.

This all-terrain hydraulic cart 33 (FIG. 6) features four pneumatic tires 37 (FIG. 6). The pneumatic tires 37 allow easy movement on grass or turf fields. This pneumatic tire, all-terrain hydraulic cart 33 (FIG. 6) features an exclusive single fork 41 (FIG. 6) mounted to a carriage 42 that travels up rails 34 (FIG. 8B) by use of a foot activated hydraulic pump 34A actuated by pump pedal 39 (FIG. 7), to raise the block high enough to stack two blocks together (FIG. 8A). Fork 41 has the same 4" height and 6" width, in cross section, as the fork 19 of FIG. 5, for the same reasons.

Figure 9:
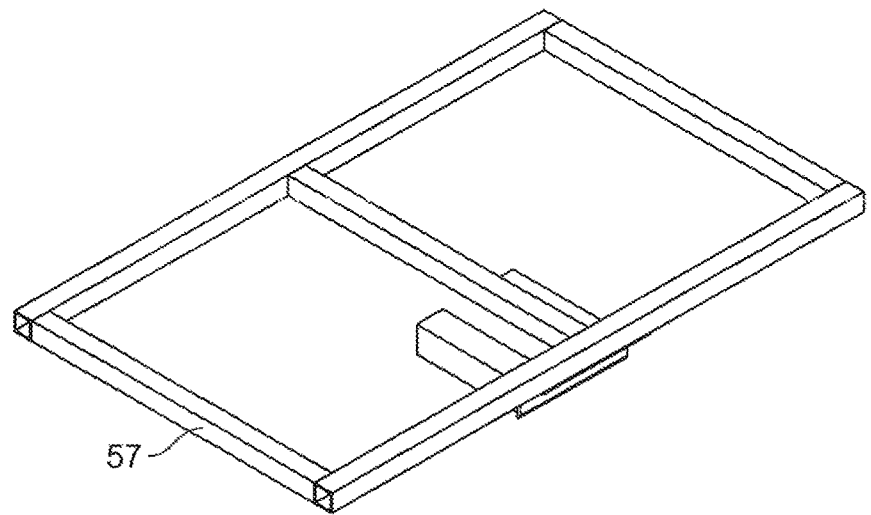
FIG. 9 is an upper front perspective view of a carrier tray.

Cart Carry Adapter 57 (FIG. 9)

Figure 10:
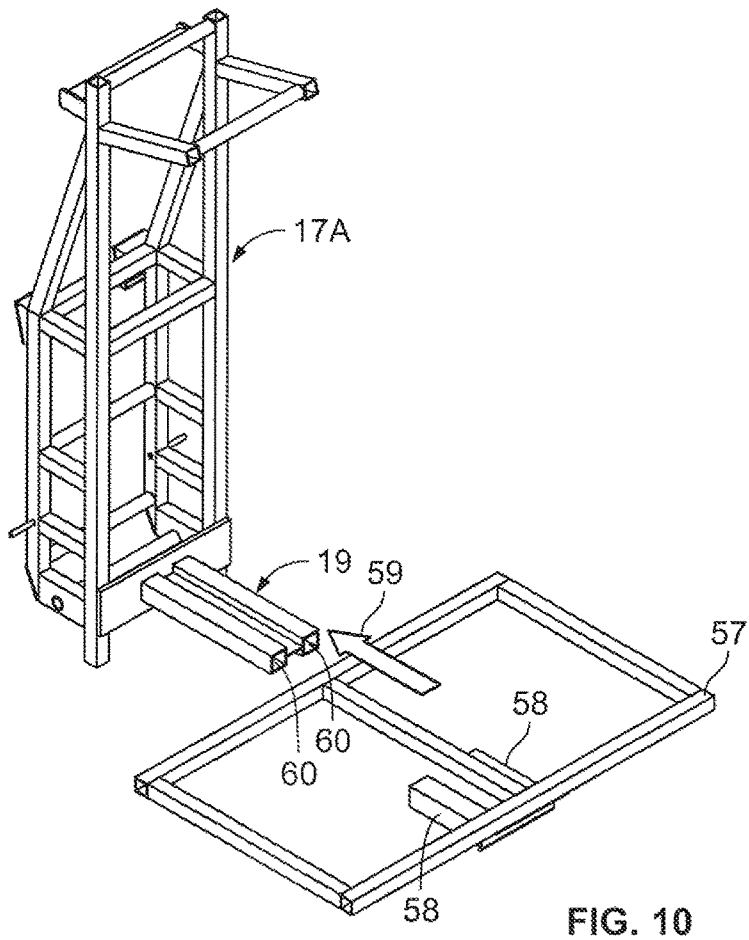
FIG. 10 an exploded upper front perspective view of the carrier tray has it would insert onto a fork.
Figure 11:
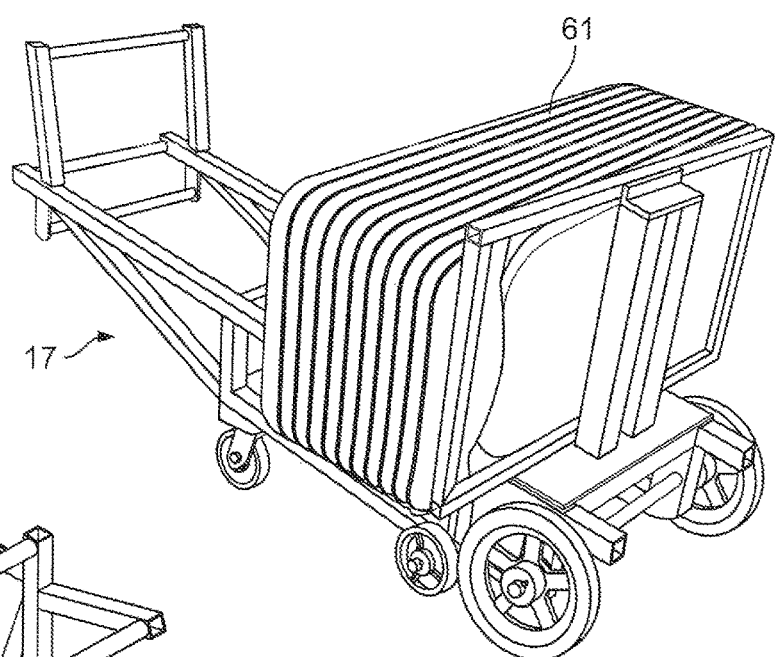
FIG. 11 is an upper front perspective view of the carrier tray, stacked with chairs, on the handcart, with the handcart in a horizontal position.
Figure 12:
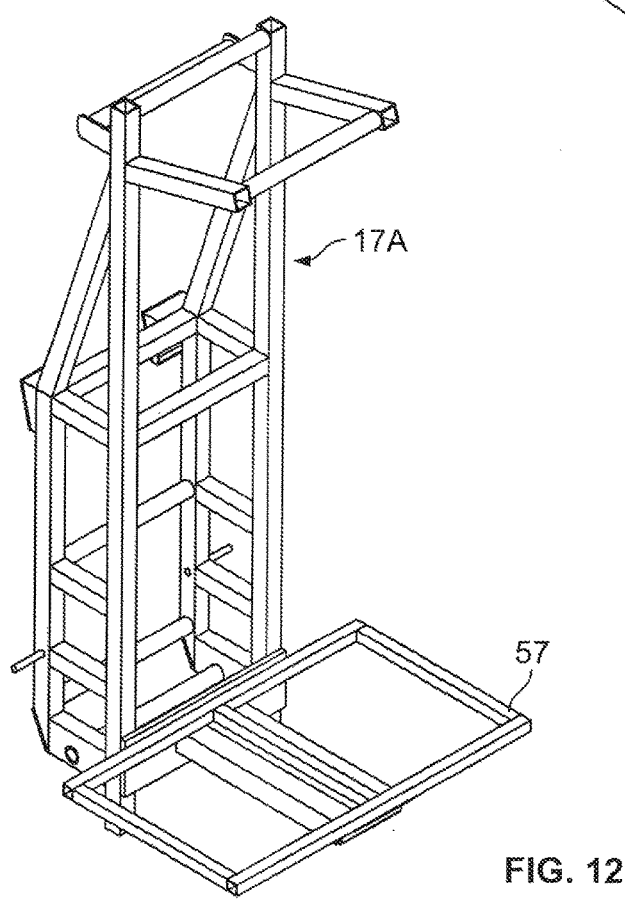
FIG. 12 is an upper front perspective view of the carrier tray, mounted on the fork of the handcart, with the handcart positioned vertically.

The cart Carry adapter 57 (FIG. 9) has a pair of carry-adapter-prongs 58 which get inserted into the tubes 20 formed inside the fork 19 (FIGS. 10 & 3) on the hand-truck 17 (FIG. 3). These carry-adapter-prongs are made of 1.5× 1.5-inch angle steel 58. The cart Carry adapter 57 creates a platform for stacking and carrying various equipment (FIG. 11), such as boxes, chairs or any other material that will fit on the hand-truck 17 (FIG. 3). The hand-truck frame 17A is shown without wheels in FIG. 10 for clarity, showing how the fork 19 is attached to the frame 17A.

Figures 13, 13A:
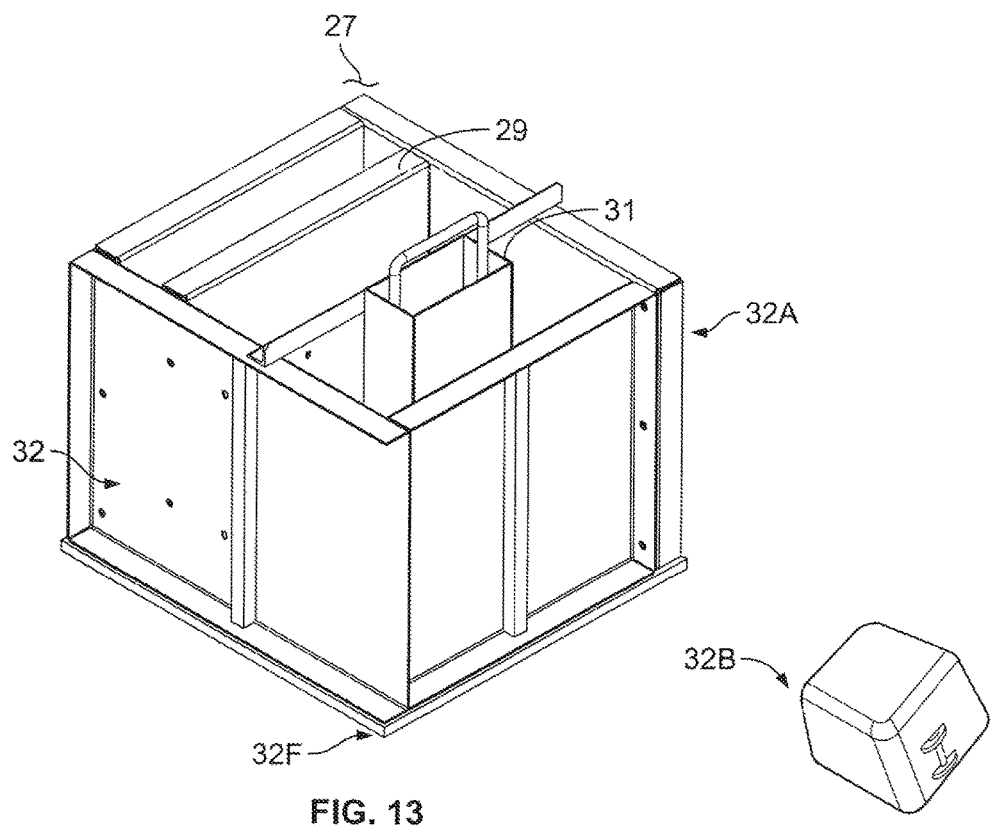
FIG. 13 is a perspective view of a steel concrete-block-casting form.

Steel Tent Ballast Cement Block Form 27 (FIG. 13 and FIGS. 28-29)

The all steel cement block form 27 (FIG. 13) is made of 2 main parts 32 and 32A. It has a fork pocket knockout 31 (FIG. 13) which will create the fork pocket 5 (FIG. 1) in the cement block 11,3,13 (FIG. 2). Fork pocket knockout 31 (FIG. 13 and FIGS. 28-29) mounts to steel form parts 32 & 32A (FIG. 13 and FIGS. 28-29) with quick thread bolts to welded quick-thread nuts (not shown). Form 27 also features a special divider 29 (FIG. 13 and FIGS. 28-29) which is movable and removable using quick bolts which attach to quick bolt nuts welded to special divider 29 (FIG. 13 and FIGS. 28-29) to create three different size blocks 11, 3, 13 (FIG. 2). The blocks 11, 3, 13 (FIG. 2) are compatible with the specially designed hand-truck 17 (FIG. 3).

Square knockout 32B (FIG. 13A and FIGS. 28-30) inserts to plywood base 32F (FIG. 13 and FIGS. 28-29) and holds front hook 32D (FIGS. 32 & 30) in place while concrete is poured into the form 27 (FIG. 13 and FIGS. 28-29).

Hook 32D (FIG. 28, 29, 30, 32) and top loop 32E are preferably galvanized steel.

Round knockout 32C mounts to steel form part 32 (FIG. 13, FIGS. 28, 29, 31, & 33) when divider 29 (FIG. 13, FIGS. 28-29) is removed to make a 700-lb. block 13 (FIG. 2) or mounts to divider 29 (FIG. 13, FIGS. 28-29) if making 350-lb. block 11 (FIG. 2) or 500-lb. block 3 (FIG. 2) using ⅜" wing nuts (not shown) Round knockout 32C (FIG. 13) holds top loop 32E (FIG. 13A, FIGS. 28-29, 31, & 33) in place while concrete is being poured. Square knockout 32B (FIG. 13A and FIGS. 28-30) and round knockout 32C (FIG. 13A, FIGS. 28-29, 31, & 33) remain inside the concrete when the concrete is dry. Both square 32B (FIG. 13A) and round knockouts 32C (FIG. 13A) are reusable.

FIG. 29 is a top plan view of casting form 27, which corresponds to a rear view of the ballasts 11, 3, & 13 that are cast therein.

Top hook 32E is held in place by round knockout 32C (FIGS. 28, 29, & 31), which is a urethane slotted dome 32C, having slot 32BS. Slotted dome 32C is bolted to bulkhead 29.

As in FIG. 30, front hook 32D is held up in slot 32BS by square urethane knockout 32B. Hook 32D is placed down into a slot 32BS of square knockout 32B. As in FIGS. 28-29 square knockout 32B is wedged between fork pocket knockout 31, and bulkhead 32F.

Figure 14:
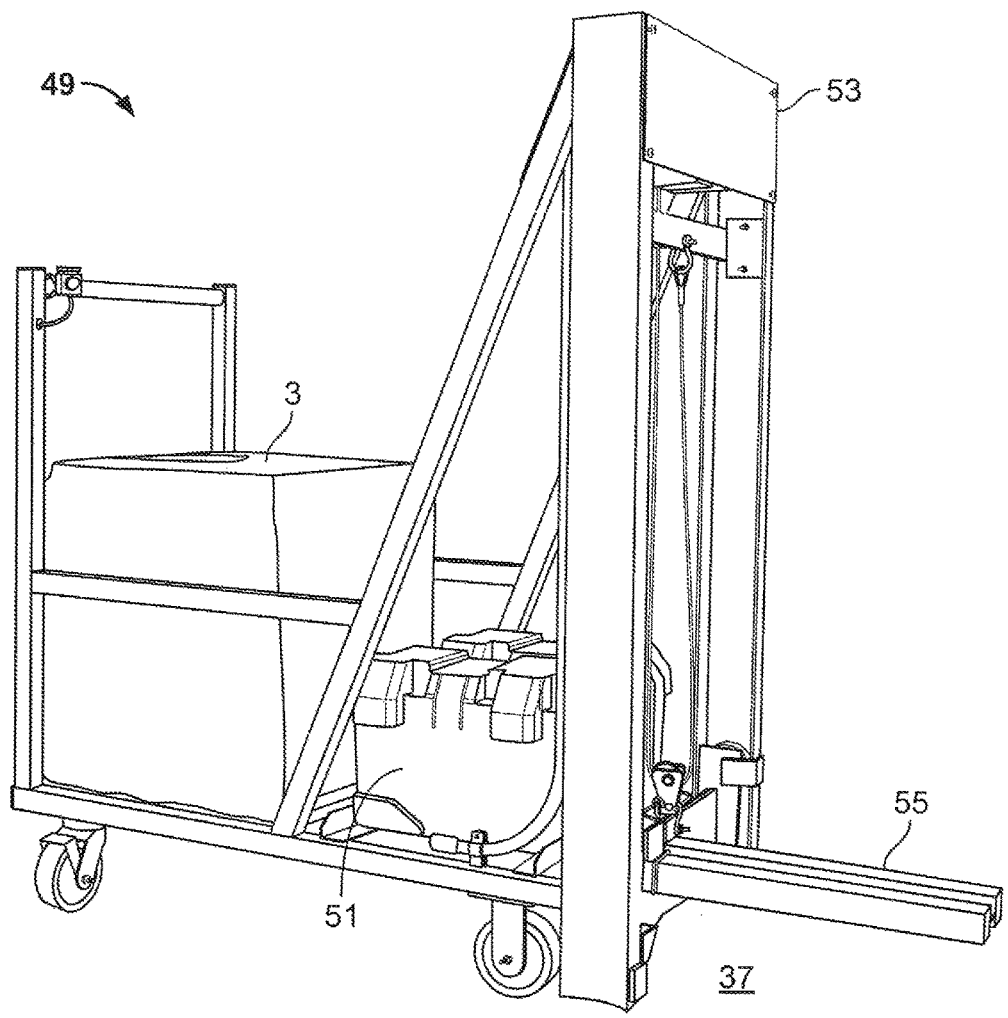
FIG. 14 is a front side perspective view of a battery powered lifting cart.

Counterbalanced Block Stacker 49 (FIG. 14)

This cart 49 (FIG. 14) features a fork 55 (FIG. 14) which is similar to fork 19. Cart 45 allows for counterbalanced stacking of blocks 11, 3, 13 (FIG. 2). An equal or greater block such as 11, 3, 13 (FIG. 2) is inserted into the cart 49. FIG. 14 shows block 3 used as a counterbalance weight. The cart 49 (FIG. 14) uses a 12 Volt battery system 51 (FIG. 14) with a winch 53 (FIG. 14) to raise and lower a block 11, 3, or 13 (FIG. 2). A manual winch (not shown) is an option, instead of the 12 Volt winch.

Figure 15:
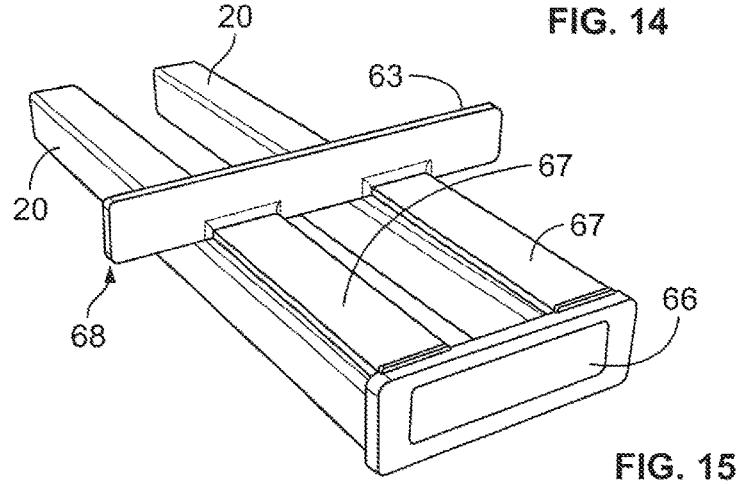
FIG. 15 is a front upper side perspective view of a block stack adapter mounted to a fork.

Block Stack Adapter 63 (FIG. 15)

Figure 16:
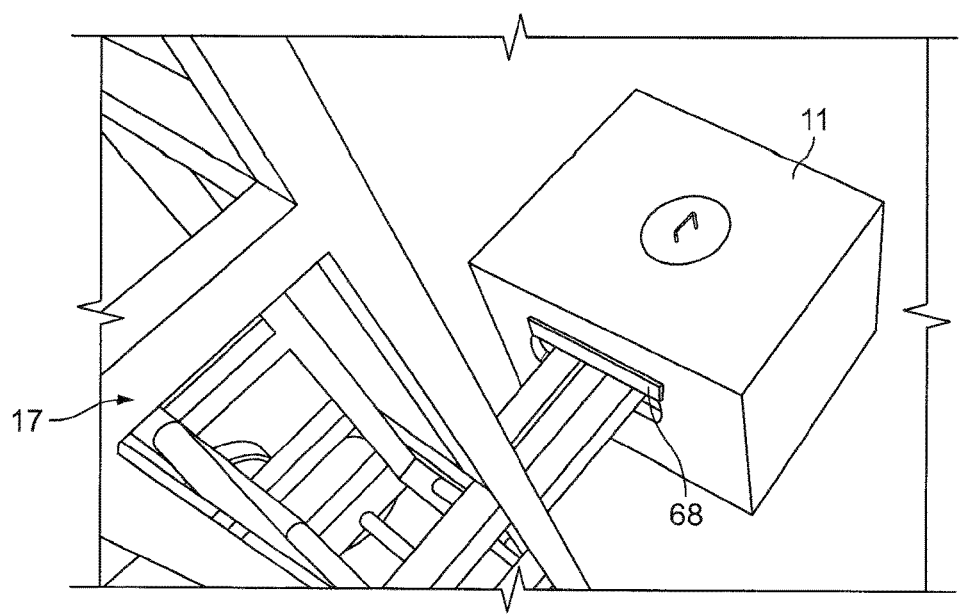
FIG. 16 is a rear side perspective view of a block mounted on a block stack adapter mounted on a fork.
Figure 16A:
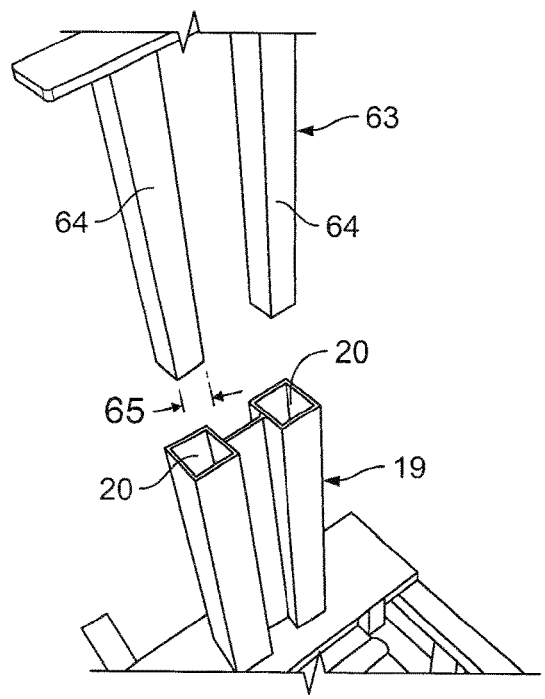
FIG. 16A an exploded perspective view the block stack adapter positioned to be inserted down into a fork.
Figure 16B:
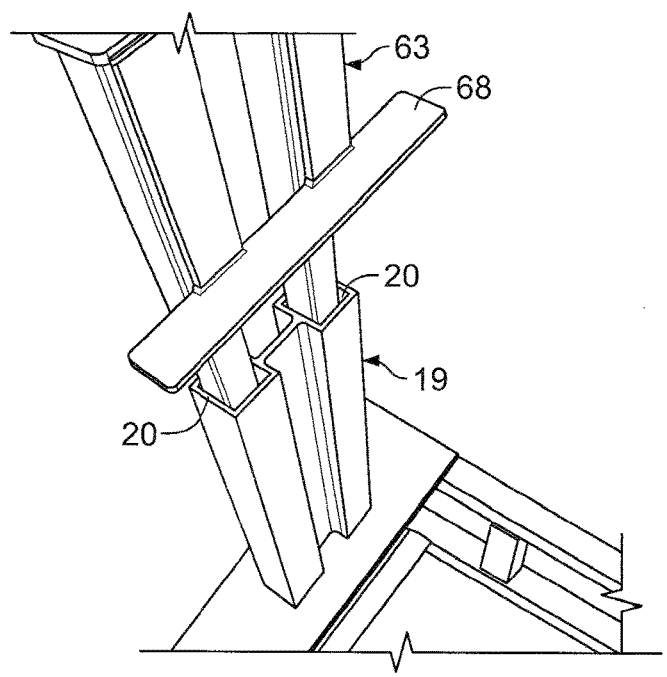
FIG. 16B is a perspective view of said block stack adapter being inserted into the fork.
Figure 16C:
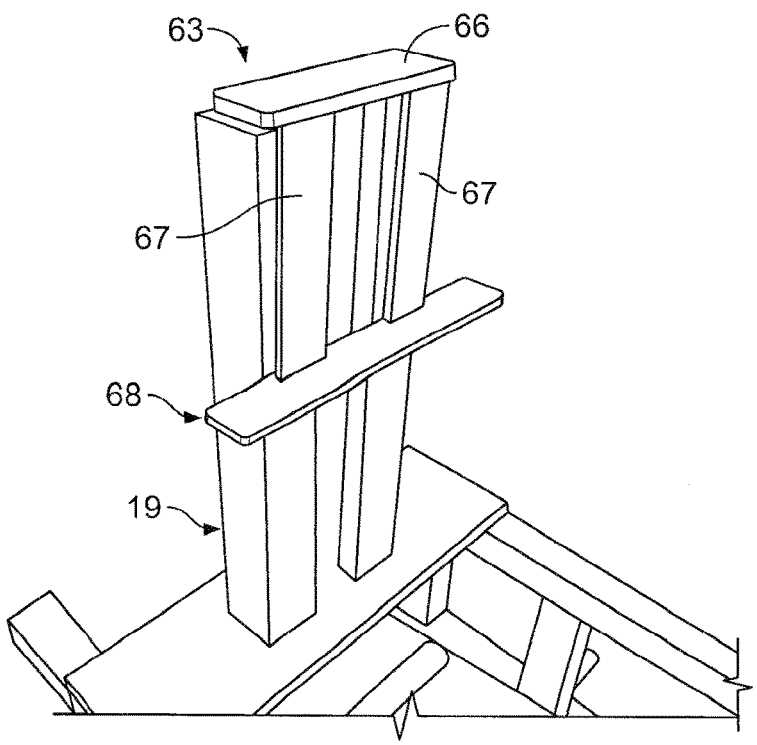
FIG. 16C is a similar view of said block stack adapter having been inserted into the fork.

The block stack adapter 63 inserts (FIG. 16B) into the fork 19 (FIGS. 3, 5B,) on the hand-truck 17 (FIG. 3). As in FIG. 16A, block stack adapter 63 comprises a pair of square tube prongs 64 having an outer dimension 65 of 1.25 inches, and fitting within fork tubes 20. As in FIG. 15, front plate 66 joins the prongs 64 together. Frame rails 67 extend from front plate 66 atop fork tubes 67 to hold stop plate 68 at the proper distance on the fork 19 (see also FIG. 16, to lift block 11

Figure 17:
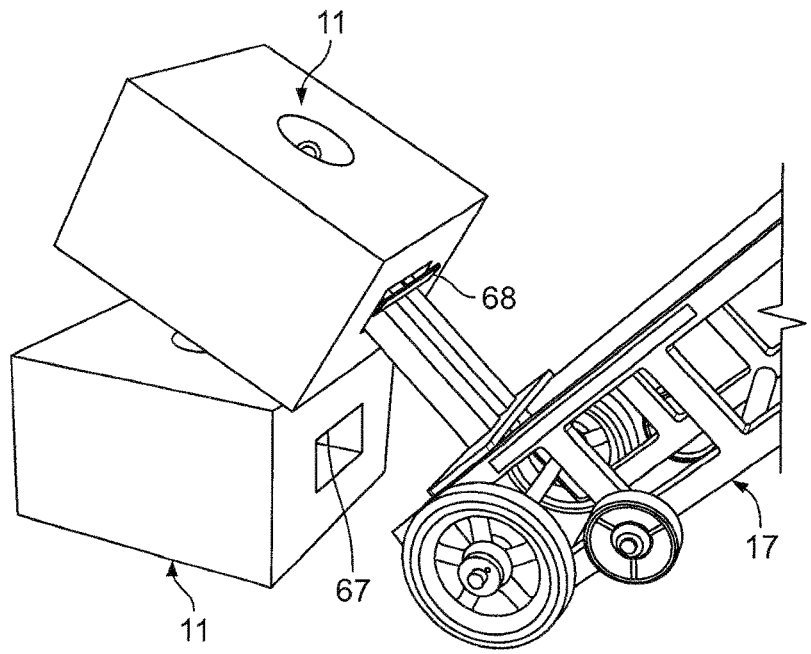
FIG. 17 is a perspective view of said block stack adapter mounted on the fork, on the handcart, being used to stack a 350-pound block atop a similar block.

This will allow the handcart 17 (FIG. 3) to stack a 350-pound block 11 (FIG. 2) on to another 350 lb. block 11 or a 500 lb. block 3 (FIG. 2), as shown in FIG. 17.

Figure 18:
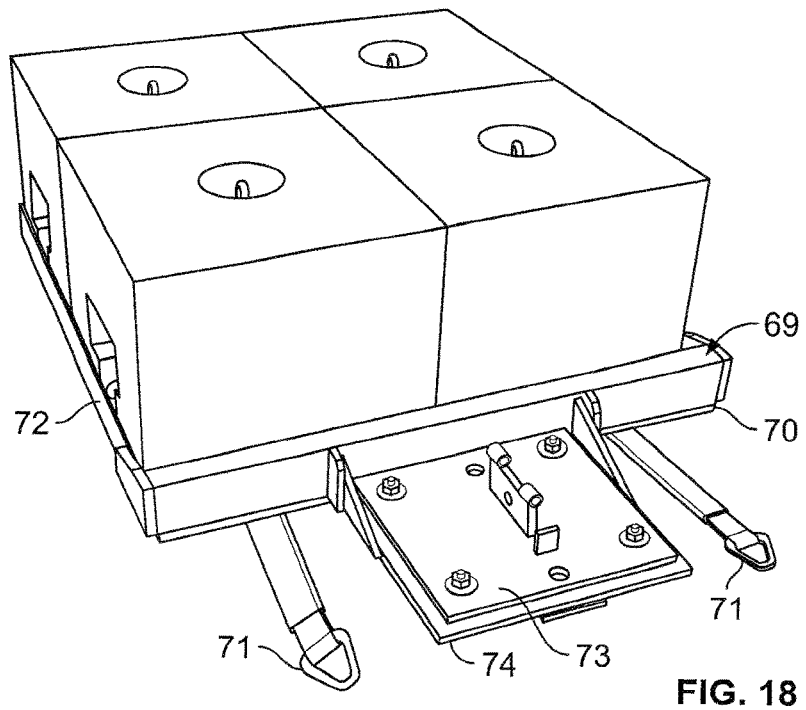
FIG. 18 is a mounting plate for mounting four concrete blocks at a single location.
Figure 18A:
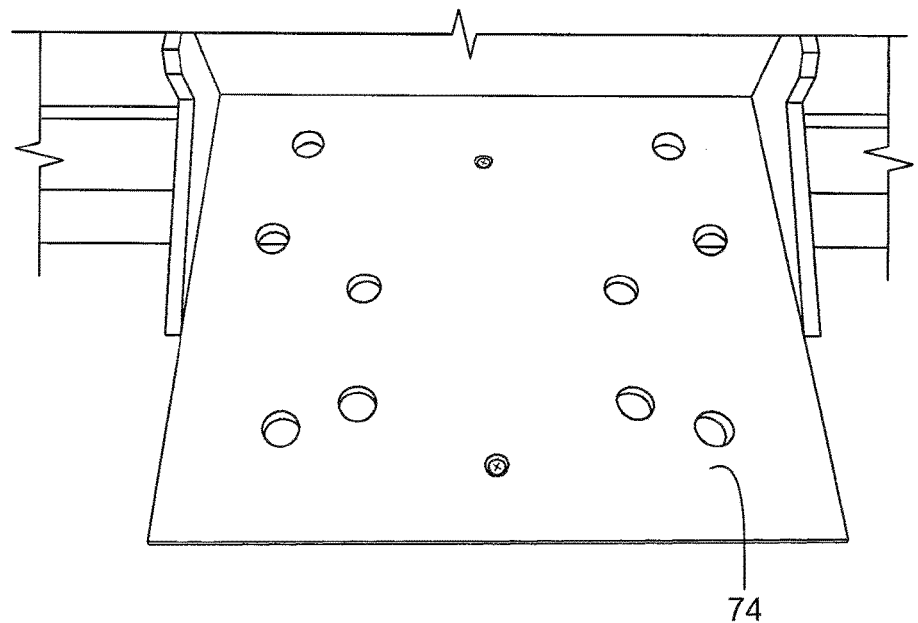
FIG. 18A is a perspective view of a mounting plate for the weight block plate.
Figure 18B:
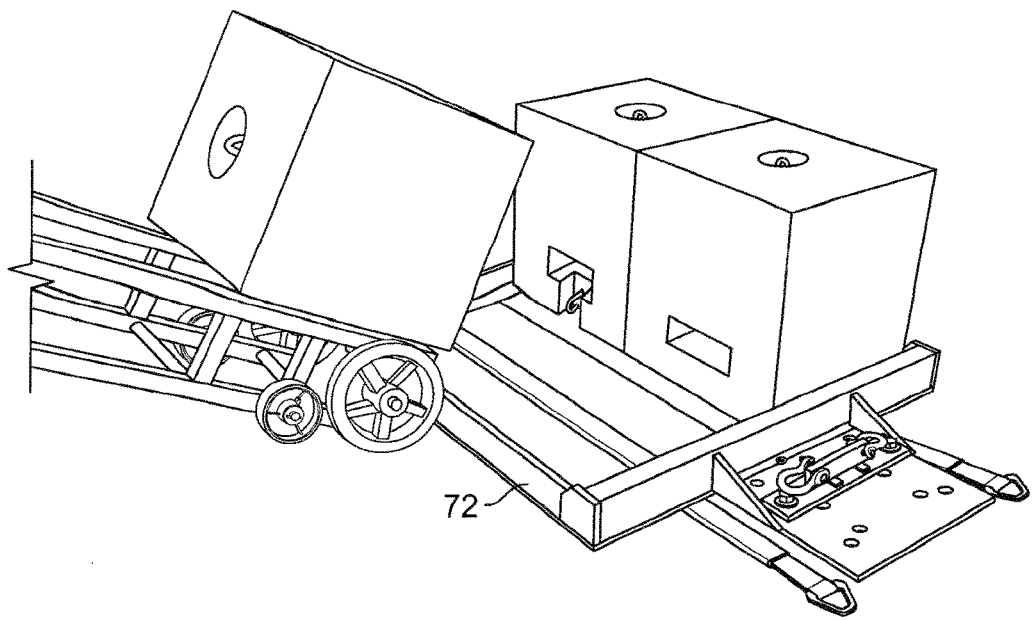
FIG. 18B is a perspective view of a block being placed atop the weight block plate.

Tent Ballast Weight Block Plate 69 (FIG. 18)

The weight block plate 69 (FIG. 18) is for holding four or more of the specially designed blocks 11, 3, 13, 15 (FIG. 2) to create larger ballast points. The weight block plate 69 (FIG. 18) features a mounting plate 74 (FIG. 18) for tent legs (not shown) to attach to. Plywood 70 (FIG. 18) is mounted to the bottom of the plate 69 to minimize sliding. Tie-off straps 71 (FIG. 18) are wrapped around the plate 69 to create a tie-off point for securing blocks 11, 3, 13, 15 (FIG. 2) to the tent ballast block plate 69 (FIG. 18).

Figure 19:
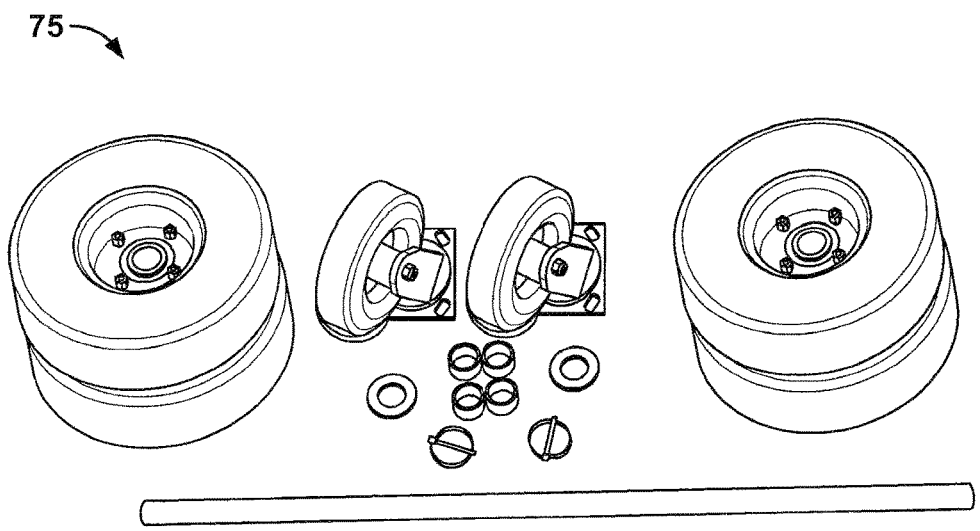
FIG. 19 is a perspective front view of an off road wheel kit for the handcart.

Off Road Wheel Kit 75 (FIG. 19)

Figure 20:
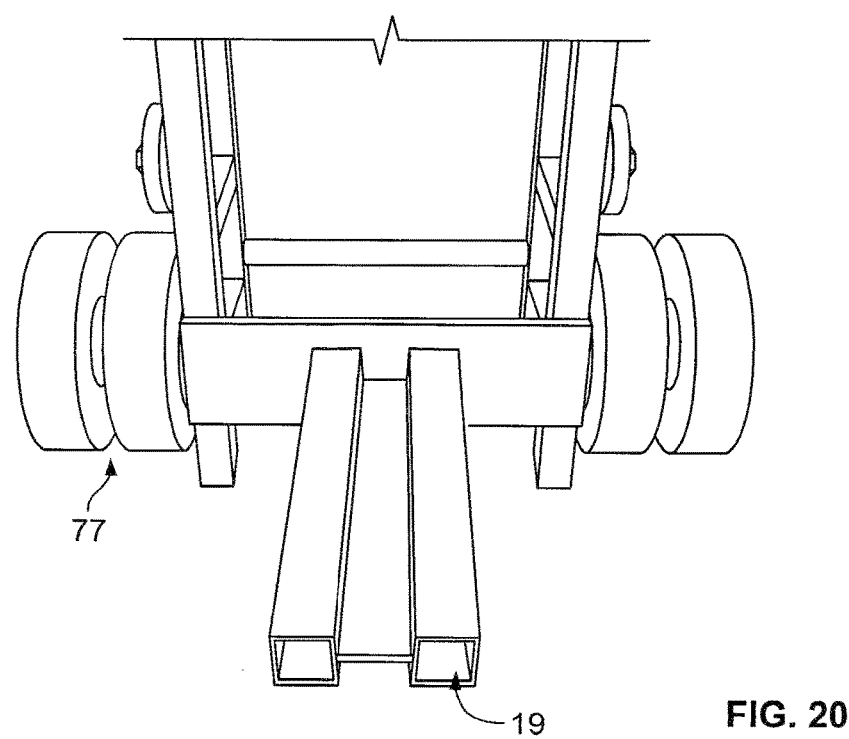
FIG. 20 is a front perspective view of the lower part of the handcart with the off-road wheel kit mounted.

The off-road wheel kit 75 (FIG. 19) features specially designed wheels 77 (FIG. 20), 79 (FIG. 21), with a no-flat feature, and special heavy-duty hubs 80 (FIG. 21) to handle the weight of cement blocks 11, 3, 13 (FIG. 2) on the hand-truck 17 (FIG. 3). 10" main wheels with airless tires 77 (FIG. 20) are set in tandem on each side of the cart. Also includes two no-flat swivel wheels 79 (FIG. 21).

Wheels 79 have essentially the same outer diameter as wheels 24 (FIG. 3), so as not to change the fork elevation 19E when changing between wheels 24 and wheels 79

Figure 21:
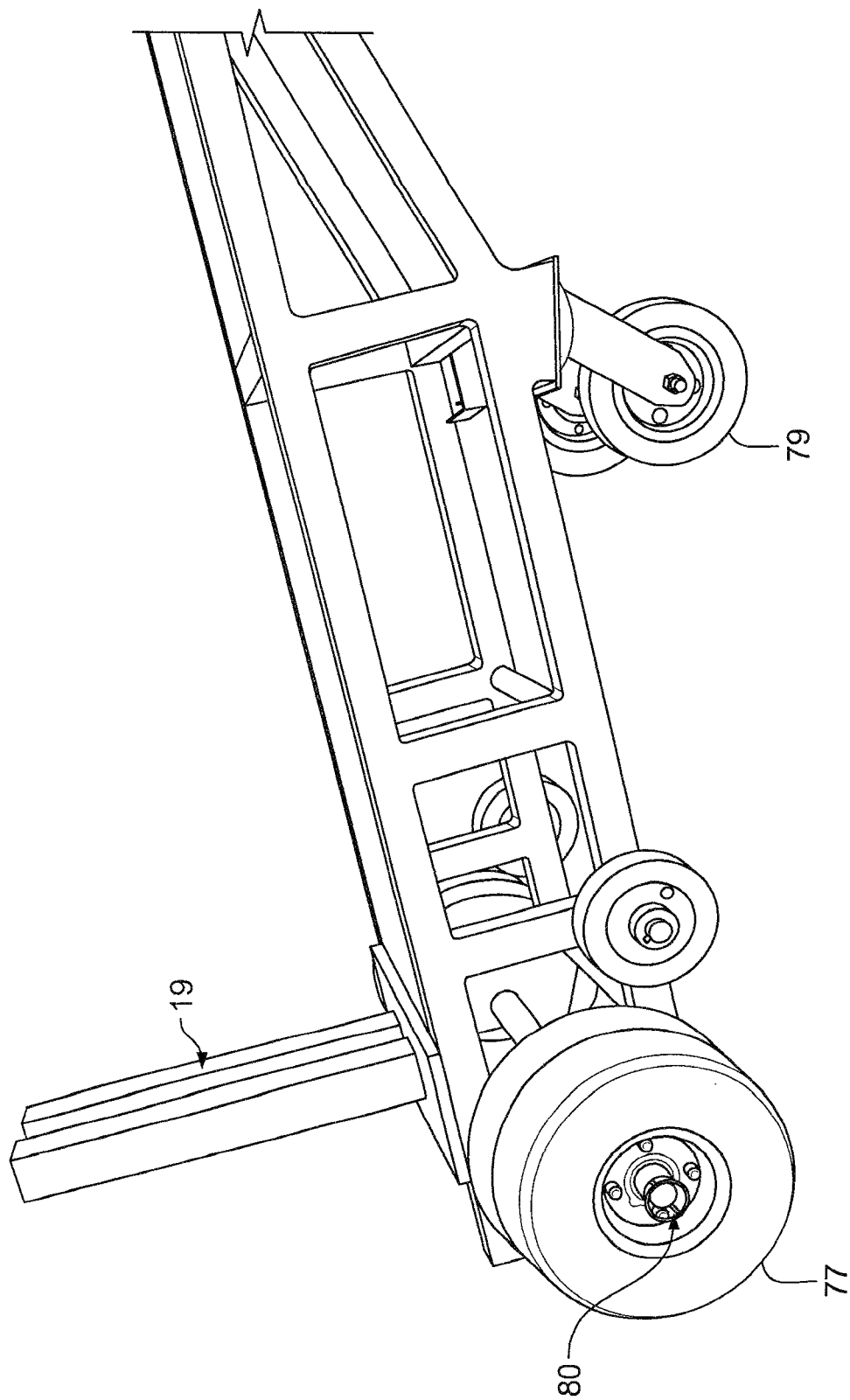
FIG. 21 is a side perspective view of the handcart in its horizontal position with the off-road wheel-kit mounted.

FIG. 21 is a side perspective view of the handcart 17 in its of horizontal position, with the off-road wheel kit 75 mounted. Heavy-duty hubs 80 mount 10" main wheels with airless tandem tires. 77 No-flat swivel wheels 79 (FIG. 21) allow the cart 17 to be pushed in a horizontal position, with fork 19 in a near vertical tilt.

FIG. 22 is a front elevation of a 350-pound block 11 alongside a 500-pound block 3 alongside a 700-pound block 13, each showing a top tie off point 32E, which would be hidden in this view. Top tie off point 32E is a galvanized steel bar with a central horse-shoe bend 6, so that its ends 33e are embedded in the cast concrete of the ballast, but the horse-shoe bend 6, protrudes into recess 7 of each block. The bends 6, give each bar 32e a vertical dimension of 3.94". Each bar 32e does not protrude above the top to surfaces 33t of the blocks (11, 3, 13, & 15), so as not to interfere with stacking of the blocks atop each other. Bent bar 32E is 13.87" from end 33e to end 33e.

Fork pockets 5 pass completely through each of the three blocks. Pockets 5 have their lower edges 4" from the bottom of each block. Pockets 5 have their side edges 6" from both sides of each block.

Front hooks 32D are visible in recesses 9 in each of the blocks 11, 3, & 13.

Figure 23:
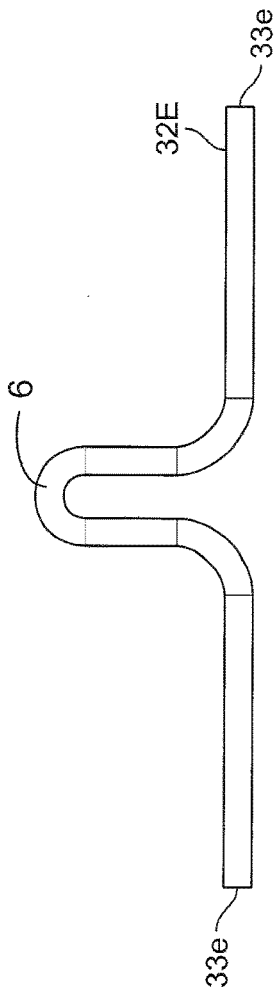
FIG. 23 is a front elevation of the top tie off point for 350 to 700 pound blocks.

FIG. 23 is a front elevation of the top tie off point 32E for 350 to 700 pound blocks.

FIG. 24 is a side elevation, sectioned through their centerlines, of a 350-pound block 11, behind a 500-pound block 3, behind a 700-pound block 13, showing a front tie off point 32D in each block. Each hook 32D is cast with its inside end:

10.98 inches (about 10") deep from the front surface 4, and 7.76" from recess 9.

Each front 32F of each hook 32D extends into each recess 9. But no part of any hook 32D protrudes past any front surface 4 of any block 11, 3, 13. Thus, front hooks 32D are available for tying-to; but are prevented from being dangerous protrusions.

Block 11 has a back 91. Block 3 has a back 93. Block 13 has a back 96. The pockets 5 pass from completely through each block 11, 3, & 13, from backs 91, 93, & 96 though fronts 4.

Figure 25:
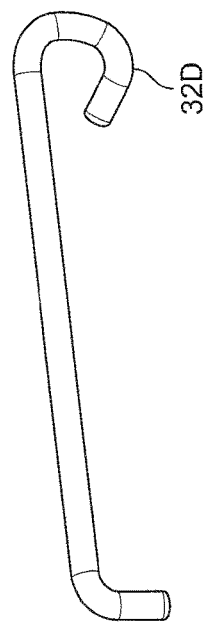
FIG. 25 is a side elevation of a front tie off point, for 350 to 700 pound blocks.

FIG. 25 is a side elevation of a front tie off point, hook 39D, for 350 to 700 pound blocks.

FIG. 26 is a front elevation of a 3500-pound block showing:

a hidden (should be dotted lines) top tie-off point 32E, in top recess 7, and a front tie-off point 82, a horse-shoe-bend 87 of which is visible in recess 9, while top tie-off point's 32E would be hidden (use dotted lines), behind front-surface 4.

But the front of front tie-off point 82 does not protrude past front surface 4 of 3500 lb. block 15, and front tie-off point 82 is thus prevented from being a dangerous protrusion.

FIG. 27 is bottom plan of the galvanized steel front tie-off point 82. A horse-shoe-bend 87 extends 4.9" forward of front tie-off point's 32E ends 88. Bent bar 82 has a length 90 of 13.88".

The invention claimed is:

1. A system for ballasting tents, said system comprising:
    a ballast cast of concrete;
    each ballast comprises:
        a top surface (33*t*);
        a front surface (4);
        a back surface (93);
        at least one pocket (5), sized, and rectangularly shaped, to receive a fork (19);
        said pocket (5) extending through the front surface (4) and through the back surface (93);
        a front recess (9) in the front surface;
        said front recess (9) below the pocket;
        a front tie-down (6.1 or 32D), cast into the ballast;
        said front tie-down being galvanized steel;
        said front tie-down having an open bend, forming a hook, extending:
            out from the concrete into the front recess (9), but not outward from the front surface (4);
        a dome shaped top recess (7) in the top surface (33*t*);
        a top tie-down point (6); and
        said top tie-down point (6):
            cast into the ballast;
            extending into the top recess (7); but not extending above the top surface (33*t*);
            the top tie down point (6) is part of a galvanized steel bar (32E),
            said galvanized steel bar (32E) having a central horse-shoe bend at the tie down point (6), so that:
                said galvanized steel bar's two ends (33*e*) are embedded in the ballast, but
                the horse-shoe bend protrudes into dome shaped top recess (7);
    said pocket has a lower edge (5L);
    said front surface (4) has a bottom edge (4B); and
    said lower edge (5L), is at a pocket elevation (5E) above the bottom edge (4B).

2. A system according to claim 1, in which:
    the bends (33) give each bar (32E) a vertical dimension of 3.94";
    each bar (32E) does not protrude above the top to surfaces 33*t* of the blocks (11, 3, 13, & 15), so as not to interfere with stacking of the blocks atop each other; and
    bent bar (32E) is 13.87" from end (33*e*) to end (33*e*).

3. A system according to claim 2, said system further comprising:
    a hand-truck (17);
    said hand-truck (17) having a pair of carrying rails (17C);
    said hand-truck (17) having a fork (19);
    said fork (19) extends horizontally from the carrying rails (17C);
    said hand-truck (17) has a pair of bottom wheels (24);
    said bottom wheels (24) each have a wheel bottom (24B);
    said fork (19) extends horizontally from the carrying rails (17C);
    said fork (19) extends from the carrying rails (17C) at a fork elevation (19E); and
    the fork elevation (19E) is greater than the pocket elevation (5E).

4. A system according to claim 3, in which:
    the pocket (5) has a rectangular cross-section;
    the rectangular cross-section has a pocket height (5H); and
    the rectangular cross-section has a pocket width (5W).

5. A system according to claim 3, in which:
    the fork (19) has a fork cross section;
    the fork cross section has four outside corners, separated by:
        an outside fork height (19*h*), and
        an outside fork width (19*w*);
    the pocket height (5H) exceeds the outside fork height (19*h*) by a minimum of two inches; and
    the pocket width (5W) exceeds the outside fork width (19*w*) by a minimum of two inches.

6. A system according to claim 5, in which:
    the outside fork height (19*h*) is 2 inches;
    the outside fork width (19*w*) is 6 inches;
    the pocket height (5H) is four inches; and
    the pocket width (5W) is four inches.

7. A system according to claim 6, in which:
    the fork cross section comprises two square sections of steel box tubing (20); and
    the two square sections of steel box tubing (20) are joined to each other by a welded center plate (21).

8. A system according to claim 3, in which:
    said lower edge (5L), is at the pocket elevation (5E) of at least four inches above the bottom edge (4B).

9. A system according to claim 1, in which:
    the fork elevation (19E) is 5%16", above the ground under the bottom of an upright cart (17).

10. A system for ballasting tents, said system comprising:
    a ballast cast of concrete;
    each ballast comprises:
        a top surface (33*t*);
        a front surface (4);
        a back surface (93);
        at least one pocket (5), sized, and rectangularly shaped, to receive a fork (19);
        said pocket (5) extending through the front surface (4) and through the back surface (93);
        a front recess (9) in the front surface;
        said front recess (9) below the pocket;
        a front tie-down (6.1 or 32D), cast into the ballast;
        said front tie-down being galvanized steel;
        said front tie-down having an opened bend, forming a hook, extending:
            out from the concrete into the front recess (9), but not outward from the front surface (4);
        a dome shaped top recess (7) in the top surface (33*t*);
        a top tie-down point (6);
        said top tie-down point (6):
            cast into the ballast;
            extending into the top recess (7); but not extending above the top surface (33*t*);
            the top tie down point (6) is part of a galvanized steel bar (32E),
            said galvanized steel bar (32E) having a central horse-shoe bend at the tie-down point (6), so that:

said galvanized steel bar's two ends (33*e*) are embedded in the ballast, but the horse-shoe bend protrudes into dome shaped top recess (7);

said pocket has a lower edges (5L);

said front surface (4) has a bottom edge (4B); and said lower edge (5L), is at a pocket elevation (5E) above the bottom edge (4B);

the bend (33) give each bar (32E) a vertical dimension of 3.94";

each bar (32E) does not protrude above the top to surfaces (33*t*) of the blocks (11, 3, 13, & 15), so as not to interfere with stacking of the blocks atop each other; and bent bar (32E) is 13.87" from end (33*e*) to end (33*e*);

a hand-truck (17);

said hand-truck (17) having a pair of carrying rails (17C);

said hand-truck (17) having a fork (19);

said fork (19) extends horizontally from the carrying rails (17C);

said hand-truck (17) has a pair of bottom wheels (24);

said bottom wheels (24) each have a wheel bottom (24B);

said fork (19) extends horizontally from the carrying rails (17C);

said fork (19) extends from the carrying rails (17C) at a fork elevation (19E); and the fork elevation (19E) is greater than the pocket elevation (5E);

the pocket (5) has a rectangular cross-section;

the rectangular cross-section has a pocket height (5H); and the rectangular cross-section has a pocket width (5W);

the fork (19) has a fork cross section;

the fork cross section has four outside corners, separated by:
an outside fork height (19*h*), and
an outside fork width (19*w*);

the pocket height (5H) exceeds the outside fork height (19*h*) by a minimum of two inches;
the outside fork height (19*h*) is 2 inches;
the outside fork width (19*w*) is 6 inches;
the pocket height (5H) is four inches; and
the pocket width (5W) is four inches;

the fork cross section comprises two square section of steel box tubing (20); and the two square sections of steel box tubing (20) are joined to each other by a welded center plate (21);

said lower edge (5L), is at the pocket elevation (5E) of at least four inches above the bottom edge (4B); and the fork elevation (19E) is 5$^{9}/_{16}$", above the ground under the bottom of the hand-truck (17).

\* \* \* \* \*